(12) United States Patent
Thacker et al.

(10) Patent No.: US 9,003,764 B2
(45) Date of Patent: Apr. 14, 2015

(54) SYSTEM AND METHOD FOR THERMAL CONTROL IN A GAS TURBINE ENGINE

(75) Inventors: Pradeep Stanley Thacker, Bellaire, TX (US); Aaron John Avagliano, Houston, TX (US)

(73) Assignee: General Electric Company, Schenectady, NY (US)

( * ) Notice: Subject to any disclaimer, the term of this patent is extended or adjusted under 35 U.S.C. 154(b) by 676 days.

(21) Appl. No.: 13/329,203

(22) Filed: Dec. 16, 2011

(65) Prior Publication Data

US 2013/0152598 A1 Jun. 20, 2013

(51) Int. Cl.
F02C 7/08 (2006.01)
F02C 6/00 (2006.01)
F02C 3/30 (2006.01)
F22B 1/18 (2006.01)
F02C 1/00 (2006.01)
F02C 1/06 (2006.01)
F02C 6/04 (2006.01)

(52) U.S. Cl.
CPC . F02C 1/06 (2013.01); F02C 1/007 (2013.01); F02C 6/00 (2013.01); F02C 6/003 (2013.01); F02C 6/04 (2013.01); Y02E 20/16 (2013.01)

(58) Field of Classification Search
USPC ........ 60/39.182, 39.5, 39.17, 39.52; 122/7 R, 122/7 B
See application file for complete search history.

(56) References Cited

U.S. PATENT DOCUMENTS

| | | | | |
|---|---|---|---|---|
| 3,232,052 A | * | 2/1966 | Ricard | 60/39.182 |
| 4,592,204 A | * | 6/1986 | Rice | 60/792 |
| RE36,497 E | * | 1/2000 | Tomlinson | 60/783 |
| 7,546,742 B2 | | 6/2009 | Wakeman et al. | |
| 2009/0145127 A1 | * | 6/2009 | Vollmer et al. | 60/618 |
| 2011/0314815 A1 | * | 12/2011 | Li et al. | 60/645 |

OTHER PUBLICATIONS

Ladwig, M., et al. "The Realized Gas Turbine Process with Sequential Combustion Experience, State of Development, Prospects," Alstom, Brown Boveri Str. 7, CH-5401 Baden, Switzerland, VGB GT Jun. 2007, pp. 1-12.

* cited by examiner

*Primary Examiner* — Gerald L Sung
(74) *Attorney, Agent, or Firm* — Fletcher Yoder P.C.

(57) ABSTRACT

A system includes a gas turbine engine that includes a compressor section configured to generate compressed air and a combustor coupled to the compressor section. The combustor is configured to combust a first mixture comprising the compressed air and a first fuel to generate a first combustion gas. The gas turbine engine also includes a turbine section coupled to the combustor. The turbine section is configured to expand the first combustion gas to generate an exhaust gas. The gas turbine engine also includes a boiler coupled to the turbine section. The boiler is configured to combust a second mixture comprising a portion of the first combustion gas and a second fuel to generate a second combustion gas that is routed to the turbine section. In addition, the boiler generates a first steam from heat exchange with the second combustion gas.

23 Claims, 4 Drawing Sheets

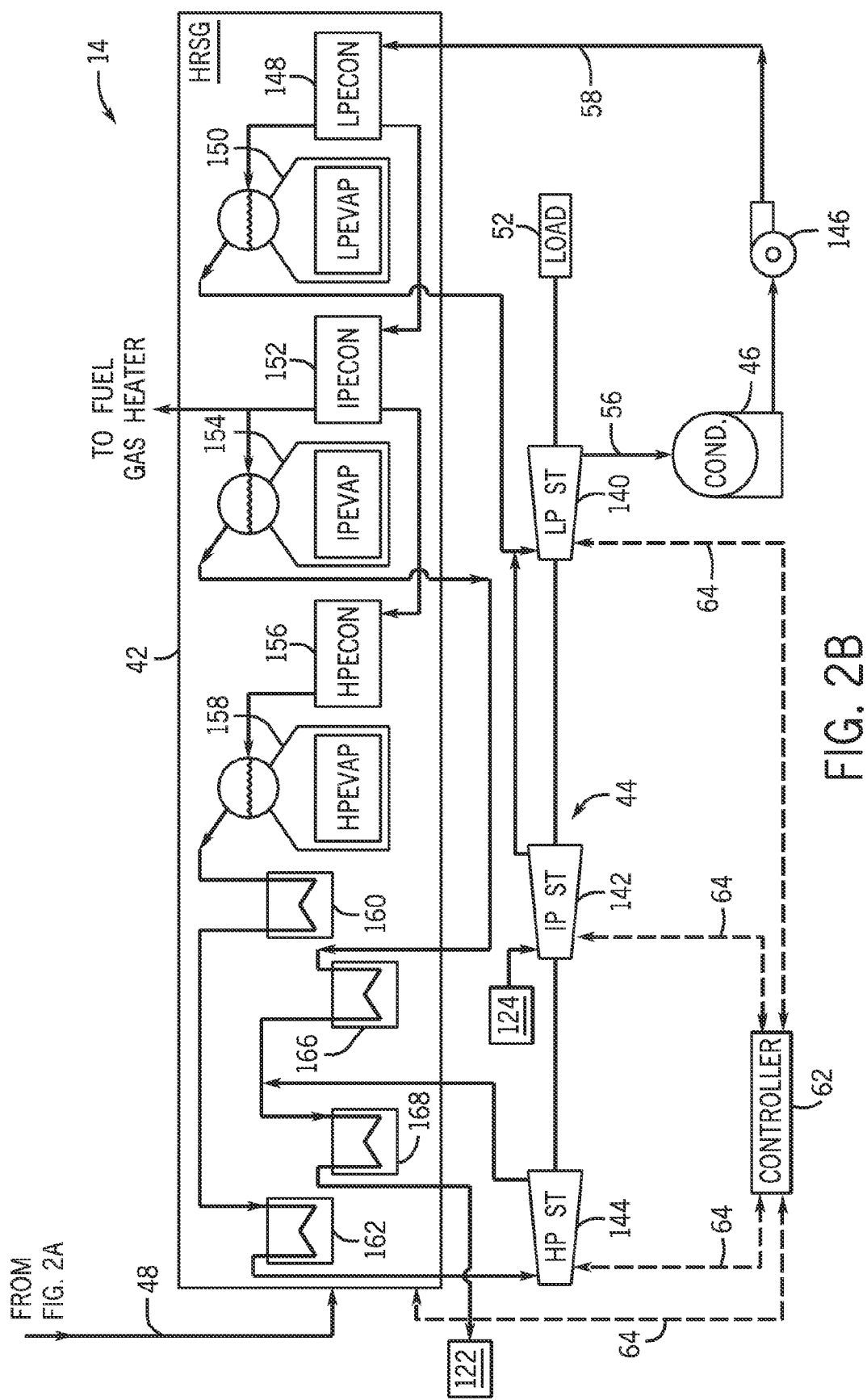

SYSTEM AND METHOD FOR THERMAL CONTROL IN A GAS TURBINE ENGINE

BACKGROUND OF THE INVENTION

The subject matter disclosed herein relates to gas turbine engines, and more particularly, to thermal control in gas turbine engines.

Gas turbine engines may include, in serial flow arrangement, a compressor for compressing air flowing through the engine, a combustor in which fuel is mixed with the compressed air and ignited to form a gas stream, and a turbine. The compressor, combustor, and turbine are sometimes collectively referred to as a core engine. Such gas turbine engines may also include a low-pressure turbine or power turbine for transmitting power generated by the core engine to a driven component, such as a generator, for example. Unfortunately, an exit temperature of an exhaust gas from the core engine may be insufficient to enable the core engine to be used in a combined cycle system to generate steam efficiently.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine engine that includes a compressor section configured to generate compressed air and a combustor coupled to the compressor section. The combustor is configured to combust a first mixture comprising the compressed air and a first fuel to generate a first combustion gas. The gas turbine engine also includes a turbine section coupled to the combustor. The turbine section is configured to expand the first combustion gas to generate an exhaust gas. The gas turbine engine also includes a boiler coupled to the turbine section. The boiler is configured to combust a second mixture comprising a portion of the first combustion gas and a second fuel to generate a second combustion gas that is routed to the turbine section. In addition, the boiler generates a first steam from heat exchange with the second combustion gas.

In a second embodiment, a system includes a turbine controller configured to control a reheater to increase a temperature of an exhaust gas generated by a turbine coupled to the reheater. The reheater is configured to combust a mixture comprising a first combustion gas and a fuel to generate a second combustion gas that is routed to the turbine to be expanded. The reheater also generates steam from heat exchange with the second combustion gas.

In a third embodiment, a method includes compressing air in a compressor section to generate compressed air, combusting a first mixture including the compressed air and a first fuel in a combustor coupled to the compressor section to generate a first combustion gas, expanding the first combustion gas in a turbine section coupled to the combustor to generate an exhaust gas, combusting a second mixture including a portion of the first combustion gas and a second fuel in a boiler coupled to the turbine section to generate a second combustion gas, routing the second combustion gas to the turbine section, and generating a first steam in the boiler by exchanging heat from the second combustion gas to a boiler feedwater.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIGS. 2A and 2B depict a block diagram of an embodiment of a combined cycle that includes a gas turbine engine with a boiler, a multi-stage gas turbine engine, and a multi-stage steam turbine;

DETAILED DESCRIPTION OF THE INVENTION

Figure 1:
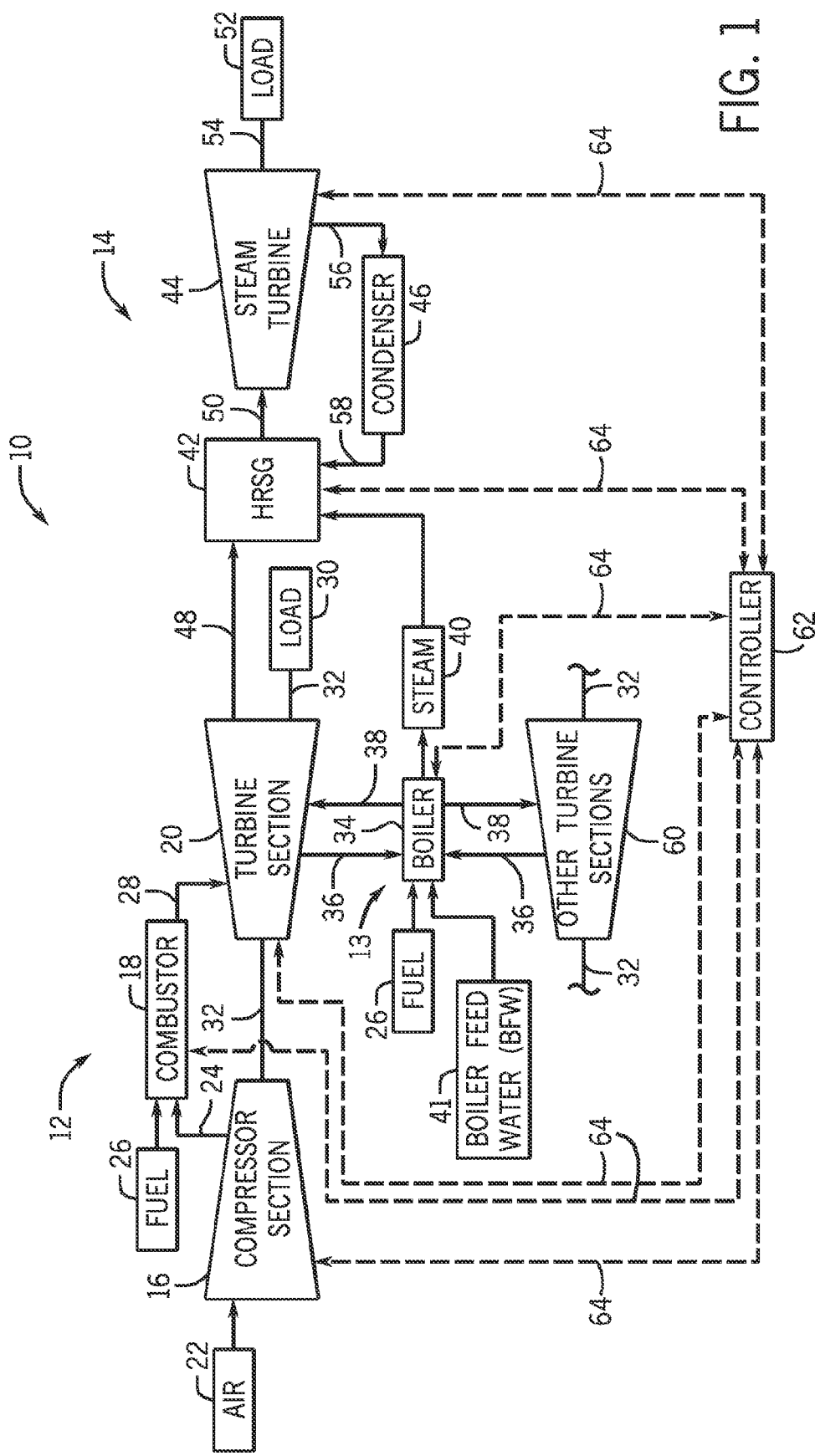
FIG. 1 is a block diagram of an embodiment of a combined cycle system that include a gas turbine engine with a boiler.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to turbomachinery, such as multi-stage turbines, e.g., gas turbine engines or steam turbines. In the disclosed embodiments, the multi-stage turbine includes at least one reheater (e.g., combustor) to add heat to the hot fluid (e.g., combustion gas) driving the turbine stages, thereby enabling the hot fluid to supply sufficient heat to drive a heat recovery steam generator (HRSG) system. This added heat is particularly advantageous for lower temperature turbines, such as the LMS100 turbine manufactured by General Electric Company of Schenectady, N.Y., because it enables use of the turbine in combined cycle systems with the HRSG and a steam turbine. For example, the LMS100 may have a high efficiency (e.g., greater than 46% lower heating value (LHV)), but an exit temperature limit of less than approximately 425 degrees Celsius. In certain embodiments, a system may include a compressor section to generate compressed air, a combustor section coupled to the compressor section, and a turbine section coupled to the combustor, wherein the turbine section includes 1, 2, 3, 4, 5, or more reheaters, such as secondary combustors, boilers, etc. The combustor section may combust a first mixture that includes the compressed air from the compressor section and a first fuel to generate a first combustion gas. The turbine section may expand the first combustion gas to generate an exhaust gas. As noted above, the system may also include at least one reheater (e.g., a boiler) coupled to the turbine section. The boiler may combust a second mixture that includes a portion of the first combustion gas, which may include oxygen, and a second fuel to generate a second combustion gas that is routed to the turbine section. In addition, the boiler may generate a first steam from heat exchange with the second combustion gas. In certain embodiments, the system may be a gas turbine engine, which combusts natural gas, a syngas, natural gas, liquid fuel, or other fuel. Furthermore, certain embodiments of the compressor section may include a first compressor that generates a first compressed air, an intercooler coupled to the first compressor, and a second compressor coupled to the intercooler. The intercooler may cool the first compressed air and the second compressor may compress the first compressed air to generate a second compressed air. In such embodiments, the combustor may be coupled to the second compressor to combust the first mixture that includes the second compressed air and the first fuel to generate the first combustion gas. The intercooler may be used to increase the efficiency of the compressor section.

In further embodiments, the gas turbine engine may be coupled to a steam power plant, which may include the HRSG coupled to the turbine section and a steam turbine coupled to the HRSG. The HRSG may generate a second steam from heat exchange with the exhaust gas, and the steam turbine may drive a load using at least the first steam, the second steam, and/or any combination thereof. Together, the gas turbine engine and the steam power plant may be referred to as a combined cycle system. In yet further embodiments, a method may include compressing air in the compressor section to generate the compressed air, combusting the first mixture that includes the compressed air and the first fuel in the combustor coupled to the compressor section to generate the first combustion gas, expanding the first combustion gas in the turbine section coupled to the combustor to generate the exhaust gas, combusting the second mixture that includes the portion of the first combustion gas and the second fuel in the boiler coupled to the turbine section to generate the second combustion gas, routing the second combustion gas to the turbine section, and generating the first steam in the boiler by exchanging heat from the second combustion gas to a boiler feedwater.

By using the at least one reheater (e.g., boiler) in the previous embodiments, a temperature of the exhaust gas from the gas turbine engine may increased such that steam may be produced by the HRSG at a temperature high enough to drive the steam turbine efficiently. In other words, the boiler may help increase the overall efficiency of the combined cycle system that includes the gas turbine engine coupled to the steam power plant. Further, the boiler may be easily added to new gas turbine engines or retrofitted to existing gas turbine engines. In particular, the boiler may be added to gas turbine engines that are unable to generate the exhaust gas at temperatures high enough to be used efficiently in the steam power plant.

Turning to the drawings, FIG. 1 is a block diagram of an embodiment of a combined cycle system 10 that includes a gas turbine engine 12 and a steam power plant 14, wherein the gas turbine engine 12 includes at least one reheater 13. As described in detail below, embodiments of the gas turbine engine 12 include the reheater 13 (e.g., boiler 34) to help increase the exhaust gas temperature. The gas turbine engine 12 may also be referred to as a Brayton cycle or as a topping cycle. The steam power plant 14 may also be referred to as a Rankine cycle or as a bottoming cycle. As shown in FIG. 1, the combined cycle system 10 uses exhaust from one heat engine (i.e., the gas turbine engine 12) as the heat source for another heat engine (i.e., the steam power plant 14), thereby extracting more useful energy from the heat and increasing the overall efficiency of the combined cycle system 10. In the illustrated embodiment, the gas turbine engine 12 includes a compressor section 16, a combustor 18, and a turbine section 20. Air 22 may enter the compressor section 16 to generate compressed air 24, which then enters the combustor 18. In certain embodiments, the gas turbine engine 12 may include a plurality of combustors 18 disposed concentrically or annularly about an axial axis of the gas turbine engine 12. In addition, fuel 26 may enter the combustor 18 and mix with the compressed air 24 to generate a first mixture that is then combusted to form a first combustion gas 28. The first combustion gas 28 may flow into the turbine section 20 to drive the compressor section 16 and a load 30 via a shaft 32. For example, the first combustion gas 28 may apply motive forces to blades within the turbine section 20 to rotate the shaft 32, which may be used to drive the load 30, such as an electrical generator.

In the illustrated embodiment, the reheater 13 (e.g., boiler 34) may be coupled to the turbine section 20. The boiler 34 may receive a portion 36 of the first combustion gas 28 (e.g., boiler inlet gas) from the turbine section 20 to generate a second combustion gas 38 that is routed back to the turbine section 20. The combustion that occurs in the combustor 18 to generate the first combustion gas 28 may not be complete combustion. In other words, the first combustion gas 28 may include leftover oxygen, which reduces the efficiency of the gas turbine engine 12. Thus, the boiler 34 may receive fuel 26 that is combined with the boiler inlet gas 36, which may include the leftover oxygen, to generate a second mixture that is then combusted to form the second combustion gas 38, as described in detail below. In certain embodiments, a temperature of the second combustion gas 38 may be between approximately 370 to 700, 425 to 650, or 480 to 595 degrees Celsius greater than a temperature of the first combustion gas 28. Thus, the boiler 34 enables the leftover oxygen in the first combustion gas 28 to be used to liberate chemical energy from the fuel 26, which can then be converted into mechanical energy in the turbine section 20. In addition, the heat generated by the combustion of the second mixture within the boiler 34 may be used to generate boiler steam 40. For example, the boiler 34 may receive boiler feedwater 41 that is vaporized by the heat of combustion to generate the boiler steam 40. In further embodiments, the fuel 26 used in the combustor 18 and the boiler 34 may be the same or different from one another. For example, one fuel 26 may be a gas fuel and the other fuel 26 may be a liquid fuel. Alternatively, both fuels 26 may be gas fuels, which are the same or different from one another, or both fuels 26 may be liquid fuels, which are the same or different from one another.

The steam power plant 14 coupled to the gas turbine engine 12 may include a heat recovery steam generator (HRSG) 42, a steam turbine 44, and a condenser 46. Specifically, the HRSG 42 may receive an exhaust gas 48 (after reheating) from the turbine section 20 to generate HRSG steam 50 that is then routed to the steam turbine 44. The HRSG steam 50 flowing through the steam turbine 44 may drive a load 52 via a shaft 54. For example, the HRSG steam 50 may apply motive forces to blades within the steam turbine 44 to rotate the shaft 54, which may be used to drive the load 52, such as an electrical generator. After flowing through the steam turbine 44, exhaust 56 may be routed to the condenser 46 to generate condensate 58 that may be returned to the HRSG 42 to generate additional HRSG steam 50. As shown in FIG. 1, the boiler steam 40 from the boiler 34 may be routed to the HRSG 42 to be used in the steam turbine 44 or combined with other steam streams generated by the HRSG 42. In other embodiments, the boiler steam 40 may be used elsewhere in the combined cycle system 10, power plant, gas treatment, fuel heating, gasifier feedstock/slurry heating, vapor absorption cycle (VAC) system, and so forth. As described in detail below, the boiler 34 may increase a temperature of the exhaust gas 48 such that the HRSG 42 is able to generate HRSG steam 50 at a temperature sufficient to efficiently drive the steam turbine 44. In further embodiments, the boiler 34 may be coupled to other turbine sections 60 of other gas turbine engines 12. For example, the boiler 34 may be coupled to a plurality of turbine sections 60 (e.g., 1, 2, 3, 4, 5, or more) to improve economies of scale. In further embodiments, each turbine section 20 of a plurality of gas turbine engines 12 may be coupled to one or more separate boilers 34 and/or other reheaters 13.

In certain embodiments, the combined cycle system 10 may include a controller 62 that may send and/or receive various signals 64 to or from components of the combined cycle system 10, such as the compressor section 16, the combustor 18, the turbine section 20, the reheater 13 (e.g., boiler 34), the HRSG 42, the steam turbine 44, and so forth. For example, the controller 62 may be used to maintain a temperature of the HRSG steam 50 above a minimum threshold selected to operate the steam turbine 44 efficiently. Thus, the controller 62 may receive signals 64 from the HRSG 42 and/or steam turbine 44 indicating the temperature of the HRSG steam 50. Based on this input, the controller 62 may send signals 64 to the reheater 13 (e.g., boiler 34) to either add or remove heat to the second combustion gas 38 by burning more or less fuel 26, for example. In other embodiments, the controller 62 may be used to control other aspects of the combined cycle system 10 via input received from other components of the combined cycle system 10.

Figure 2A:
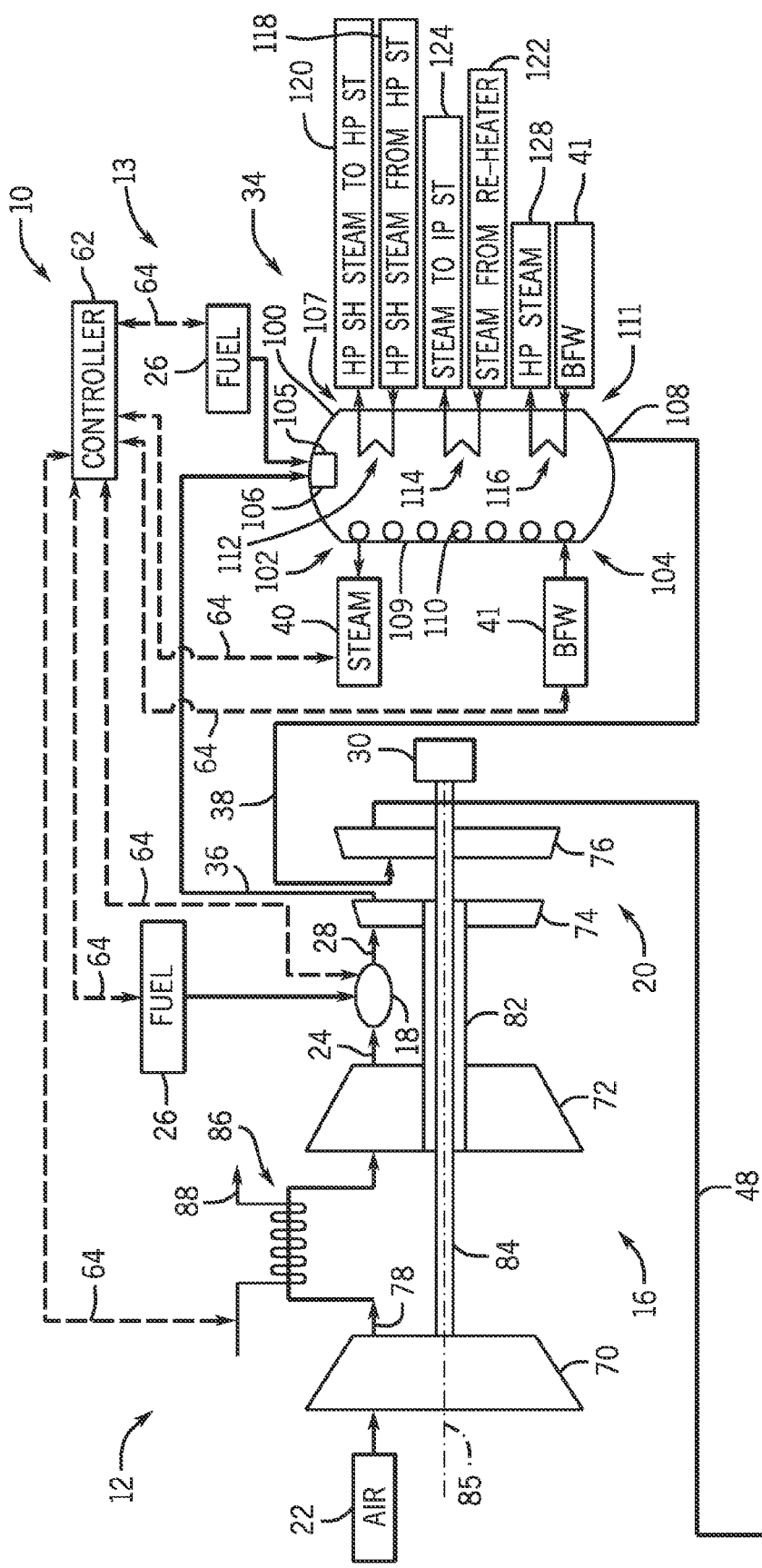

FIG. 2 is a block diagram of an embodiment of the combined cycle power system 10 having the reheater 13 (e.g., boiler 34) with a multi-stage gas turbine engine 12 and a multi-stage steam turbine 44. For clarity, FIG. 2 has been broken into FIG. 2A, which shows the gas turbine engine 12 and reheater 13, and FIG. 2B, which shows the steam power plant 14. Specifically, the gas turbine engine 12 includes, in serial flow relationship, a low pressure compressor or booster 70, a high pressure compressor 72, the combustor 18, a high pressure turbine 74, and an intermediate pressure turbine 76. Thus, the gas turbine engine 12 does not include a low pressure or power turbine downstream of the intermediate pressure turbine 76. Instead, use of the boiler 34 enables the power turbine to be omitted. In the illustrated embodiment, the gas turbine engine assembly 12 may be a modified (i.e., power turbine omitted and boiler added) LMS100 turbine manufactured by the General Electric Company of Schenectady, N.Y.

The high pressure turbine 74 may be coupled to the high pressure compressor 72 via a first rotor shaft 82, and the intermediate pressure turbine 76 may be coupled to the low pressure compressor 70 via a second rotor shaft 84. The rotor shafts 82 and 84 may be each substantially coaxially aligned with respect to a longitudinal centerline axis 85 of the gas turbine engine 12. As shown in FIG. 2, the gas turbine engine 12 may be used to drive the load 30, such as a generator, which may be coupled to the second rotor shaft 84.

In the illustrated embodiment, the gas turbine engine assembly 12 may include an intercooler heat exchanger 86 that is positioned between the low pressure compressor or booster 70 and the high pressure compressor 72 to facilitate reducing a temperature of the air 22 (e.g., air flow 78) entering the high pressure compressor 72. Using the intercooler heat exchanger 86 may facilitate increasing an efficiency of the gas turbine engine 10, while reducing the quantity of work performed by the high pressure compressor 72. In certain embodiments, the intercooler heat exchanger 86 may use ambient air or water as a cooling medium 88 to cool the air 22 (e.g., air flow 78) exiting the booster compressor 70. In an alternative embodiment, the gas turbine engine 10 does not include the intercooler heat exchanger 86.

In operation, ambient air 22 is compressed into air flow 78 in the low pressure compressor or booster 70, the air flow 78 is cooled in the heat exchanger 86, and then the cooled air flow 78 is channeled downstream to the high pressure compressor 72. The high pressure compressor 72 further compresses the air flow 78 and delivers high-pressure air 24 to the combustor 18 where it is mixed with the fuel 26, and the mixture is ignited to generate the first combustion gas 28. The first combustion gas 28 is then channeled from the combustor 18 to drive turbines 74 and 76. More specifically, the intermediate pressure turbine 76 is aerodynamically coupled to the high pressure turbine 74, and both turbines 74 and 76 are coupled to the reheater 13 (e.g., boiler 34). Collectively, the turbines 74 and 76 drive the compressors 70 and 72, and the load 30.

As shown in FIG. 2, the boiler 34 may include a pressure vessel 100, which may be configured as a vertical cylindrical vessel, a horizontal cylindrical vessel, or any other shape of vessel. The pressure vessel 100 may include an upstream side 102 that receives the boiler inlet gas 36 (e.g., combustion gas from turbine 74) and a downstream side 104 that exhausts the second combustion gas 38 (e.g., back to the turbine 76). The pressure vessel 100 may include a combustor 105 with at least one fuel injector 106 disposed near the upstream side 102. In other embodiments, the combustor 105 may be located elsewhere within the pressure vessel 100. The fuel injector 106 may be configured to combine the boiler inlet gas 36, the fuel 26, and any optional streams to produce the first mixture, which is then combusted to produce the second combustion gas 38. The fuel injector 106 may include a plurality of passages for the boiler inlet gas 36, the fuel 26, an optional oxidizer, an optional moderator, and so forth. In certain embodiments, a portion of the compressed air 24 may be used as the optional oxidizer. The second combustion gas 38 may flow from the fuel injector 106 through an interior 107 of the pressure vessel 100 and exit through an outlet 108, which may be located near the downstream side 104. As a temperature of the second combustion gas 38 may be very high, in certain embodiments, the boiler 34 may include a cooling coil 110 disposed adjacent a wall 109 of the pressure vessel 100. In certain embodiments, the cooling coil 110 may be a helical coil. Boiler feedwater 41 may circulate through the cooling coil 110 and be vaporized into boiler steam 40, thereby removing heat from the wall 109 and protecting the wall 109 from effects of the high-temperature second combustion gas 38. In certain embodiments, the boiler feedwater 41 may enter the cooling coil 110 near the downstream side 104 and the boiler steam 40 may exit near the upstream side 102. In other embodiments, other coolants may be used to remove heat from the pressure vessel 100 by circulating through the cooling coil 110. In further embodiments, a protective barrier, such as refractory brick wall, may line the wall 109 of the pressure vessel 100 to protect the wall 109 from the effects of the high-temperature second combustion gas 38. In yet further embodiments, the pressure vessel 100 may be made from materials selected to withstand contact with the high-temperature second combustion gas 38.

In the illustrated embodiment, the boiler 34 may include one or more heat exchangers 111 disposed in the interior 107. The heat exchangers 111 may be shell and tube heat exchangers, plate heat exchangers, plate fin heat exchangers, or any other type of heat exchanger. In addition, the heat exchangers 111 may be configured to remove heat from the second combustion gas 38 prior to returning to the intermediate pressure turbine 76 to be expanded to generate the heated exhaust gas 48. Specifically, boiler feedwater 41 or other sources of water or steam may circulate through the heat exchangers 111 to generate steam or superheated steam via heat exchange with the second combustion gas 38, which may be used in the steam power plant 14, as described in detail below. In certain embodiments, the boiler 34 may include a superheater heat exchanger 112 (e.g., a tertiary high-pressure superheater), a re-heater heat exchanger 114 (e.g., a tertiary re-heater), and a boiler heat exchanger 116 (e.g., a high-pressure boiler). The tertiary high-pressure superheater 112 may be configured to generate high-pressure superheated steam 120 from superheated steam 118 via heat exchange with the second combustion gas 38. The tertiary re-heater 114 may be configured to generate reheated steam 124 from steam 122 via heat exchange with the second combustion gas 38, and the high-pressure boiler 116 may be configured to generate high-pressure steam 128 from boiler feedwater 41 via heat exchange with the second combustion gas 38. As described in detail below, the tertiary high-pressure superheater 112, tertiary re-heater 114, and high-pressure boiler 116 may be coupled to different locations within the steam power plant 14, for example, different locations within the HRSG 42. In certain embodiments, the tertiary high-pressure superheater 112 may be disposed in the interior 107 closest to the upstream side 102 and the high-pressure boiler 116 may be disposed in the interior 107 closest to the downstream side 104. Thus, the tertiary re-heater 114 may be disposed between the tertiary high-pressure superheater 112 and the high-pressure boiler 116. In this configuration, the tertiary high-pressure superheater 112 is exposed to the highest-temperature second combustion gas 38 and thus, may be most efficiently used to generate the high-pressure superheated steam 120. The cooled second combustion gas 38 may then provide sufficient heat to generate the reheated steam 124 in the tertiary re-heater 114. Finally, the further cooled second combustion gas 38 may provide sufficient heat to generate the high-pressure steam 128 in the high-pressure boiler 116.

In certain embodiments, the heat exchangers 111 may be used to adjust or control a temperature of the second combustion gas 38 exiting at the outlet 108. For example, the controller 62 may receive feedback (e.g., signals 64) from various sensors disposed throughout the combined cycle system 10 and transmit signals 64 to equipment, devices, control elements, and so forth to adjust desired process parameters. In one embodiment, the controller 62 may send a signal 64 to a control element, such as a control valve, to increase a flow rate of the boiler feedwater 41 or other steam streams through the heat exchangers 111, which may reduce the temperature of the second combustion gas 38. Similarly, the controller 62 may send a signal 64 to decrease the flow rate of the boiler feedwater 41 or other steam streams through the heat exchangers 111, which may increase the temperature of the second combustion gas 38. Thus, the temperature of the second combustion gas 38 may be controlled by the controller 64 below a threshold such that design limitations of the intermediate pressure turbine 76 are not exceeded. Therefore, components of the intermediate pressure turbine 76 need not be replaced to enable use of the boiler 34. Further, even after heat exchange with the heat exchangers 111, the temperature of the second combustion gas 38 may be greater than the temperature of the boiler inlet gas 36 because of the combustion of the fuel 26 with the boiler inlet gas 36 in the boiler 34. For example, the temperature of the boiler inlet gas 36 may be between approximately 700 to 1040, 760 to 980, or 815 to 925 degrees Celsius and the temperature of the second combustion gas 38 may be between approximately 925 to 1425, 1040 to 1315, or 1150 to 1200 degrees Celsius. In certain embodiments, a temperature of the second combustion gas 38 may be between approximately 315 to 650, 370 to 595, or 425 to 540 degrees Celsius greater than a temperature of the boiler inlet gas 36. By increasing the temperature of the second combustion gas 38, a temperature of the heated exhaust gas 48 from the intermediate pressure turbine 76 may be increased. For example, when not using the boiler 34 (e.g., using the power turbine), the temperature of the heated exhaust gas 48 may be less than approximately 425 degrees Celsius. At such low temperatures, the heated exhaust gas 48 may not be hot enough to generate steam efficiently in the steam power plant 14. However, when using the boiler 34, the temperature of the heated exhaust gas 48 may be between approximately 510 to 675, 540 to 650, or 565 to 620 degrees Celsius. In one embodiment, the temperature of the heated exhaust gas 48 may be greater than approximately 575 degrees Celsius. At such high temperatures, the heated exhaust gas 48 may be hot enough to efficiently produce steam in the HRSG 42. Thus, the use of the boiler 34 with the gas turbine engine 12 may enable the gas turbine engine 12 to be used in the combined cycle system 10 together with the HRSG 42 and the steam power plant 14. In addition, the higher temperature of the heated exhaust gas 48 produced when using the boiler 34 may result in a higher sensible energy value of the heated exhaust gas 48, thereby enabling the heated exhaust gas 48 to be used to generate more energy than that generated by the power turbine of an unmodified LMS100, for example.

In the illustrated embodiment, the steam power plant 14 includes the steam turbine 44 for driving the second load 52. The second load 52 may also be an electrical generator for generating electrical power. However, both the first and second loads 30 and 54 may be other types of loads capable of being driven by the gas turbine engine 12 and the steam turbine 44. In addition, although the gas turbine engine 12 and the steam turbine 44 may drive separate loads 30 and 54, as shown in the illustrated embodiment, the gas turbine engine 12 and the steam turbine 44 may also be utilized in tandem to drive a single load via a single shaft. In the illustrated embodiment, the steam turbine 44 may include one low-pressure section 140 (LP ST), one intermediate-pressure section 142 (IP ST), and one high-pressure section 144 (HP ST). However, the specific configuration of the steam turbine 44, as well as the gas turbine engine 12, may be implementation-specific and may include any combination of sections.

The combined cycle system 10 may also include the multi-stage HRSG 42. The components of the HRSG 42 in the illustrated embodiment are a simplified depiction of the HRSG 42 and are not intended to be limiting. Rather, the illustrated HRSG 42 is shown to convey the general operation of such HRSG systems. Heated exhaust gas 48 from the gas turbine engine 12 may be transported into the HRSG 42 and used to heat steam used to power the steam turbine 44. The exhaust 56 from the low-pressure section 140 of the steam turbine 44 may be directed into the condenser 46. The condensate 58 from the condenser 46 may, in turn, be directed into a low-pressure section of the HRSG 42 with the aid of a condensate pump 146.

The condensate 58 may then flow through a low-pressure economizer 148 (LPECON), a device configured to heat feedwater with gases, which may be used to heat the condensate 58. From the low-pressure economizer 148, the condensate may either be directed into a low-pressure evaporator 150 (LPEVAP) or toward an intermediate-pressure economizer 152 (IPECON). Steam from the low-pressure evaporator 150 may be returned to the low-pressure section 140 of the steam turbine 44. Likewise, from the intermediate-pressure economizer 152, the condensate may either be directed into an intermediate-pressure evaporator 154 (IPEVAP) or toward a high-pressure economizer 156 (HPECON). In addition, steam from the intermediate-pressure economizer 152 may be sent to a fuel gas heater, where the steam may be used to heat fuel gas for use in the combustor 18 of the gas turbine engine 12. Steam from the intermediate-pressure evaporator 154 may be sent to the intermediate-pressure section 142 of the steam turbine 44. Again, the connections between the economizers, evaporators, and the steam turbine 44 may vary across implementations as the illustrated embodiment is merely illustrative of the general operation of an HRSG system that may employ unique aspects of the present embodiments.

Finally, condensate from the high-pressure economizer 156 may be directed into a high-pressure evaporator 158 (HPEVAP). Steam exiting the high-pressure evaporator 158 may be directed into a primary high-pressure superheater 160 and a finishing high-pressure superheater 162, where the steam is superheated and eventually sent to the high-pressure section 144 of the steam turbine 44. Exhaust from the intermediate-pressure evaporator 154 (IPEVAP) may be routed to a primary re-heater 166 and then directed to a secondary re-heater 168 to generate the steam 122 routed to the tertiary re-heater 114. Exhaust from the high-pressure section 144 of the steam turbine 44 may combine with the reheated steam from the primary re-heater 166 prior to routing to the secondary re-heater 168. The reheated steam 124 from the tertiary re-heater 114 may be directed into the intermediate-pressure section 142 of the steam turbine 44. Exhaust from the intermediate-pressure section 142 of the steam turbine 44 may be directed into the low-pressure section 140 of the steam turbine 44.

In other embodiments, the steam 122 to the tertiary re-heater 114 may be routed from the primary re-heater 166 instead of the secondary re-heater 168. In these embodiments, the reheated steam 124 may be routed to the secondary re-heater 168 instead of the intermediate-pressure section 142 of the steam turbine 44. In further embodiments, the superheated steam 118 to the tertiary high-pressure superheater may be routed from the primary high-pressure superheater 160 and the generated high-pressure superheated steam 120 routed to the finishing high-pressure superheater 162. In yet further embodiments, the superheated steam 118 to the tertiary high-pressure superheater may be routed from the finishing high-pressure superheater 162 and the generated high-pressure superheated steam 120 routed to the high-pressure section 144 of the steam turbine 44. Other arrangements and configurations of the lines between the boiler 34 and the HRSG 42 are possible depending on the steam balance, steam usage rates, steam generation rates, and so forth.

In combined cycle systems such as system 10, heated exhaust gas 48 may flow from the gas turbine engine 12 and pass through the HRSG 42 and may be used to generate high-pressure, high-temperature steam. The steam produced by the HRSG 42 may then be passed through the steam turbine 44 for power generation. In addition, the produced steam may also be supplied to any other processes where superheated steam may be used. As mentioned above, the gas turbine engine 12 is often referred to as the "topping cycle," whereas the steam power plant 14 is often referred to as the "bottoming cycle." By combining these two cycles, as illustrated in FIG. 2, the combined cycle system 10 may lead to greater efficiencies in both cycles. In particular, exhaust heat from the topping cycle may be captured and used to generate steam for use in the bottoming cycle.

Figure 3:
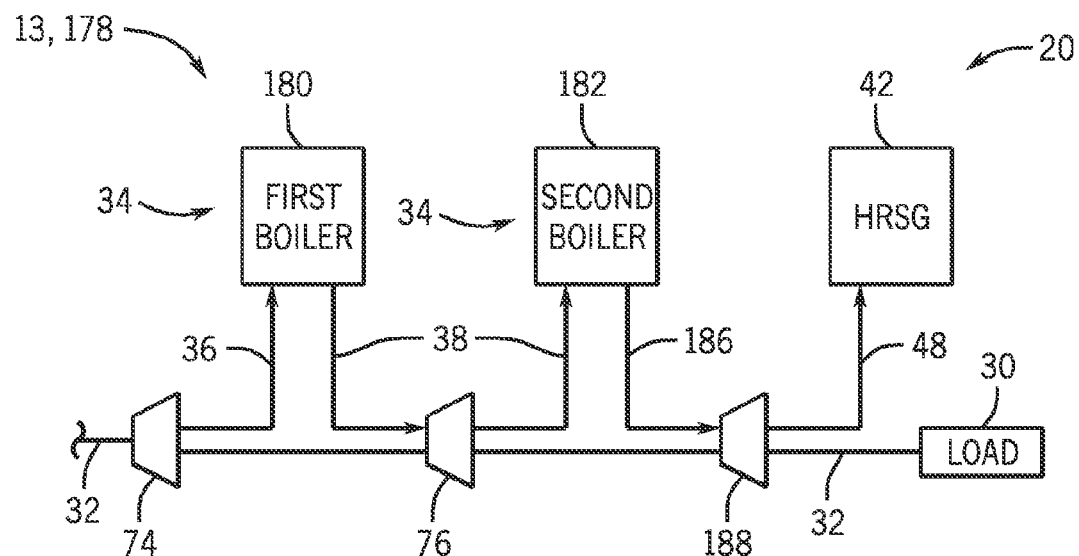
FIG. 3 is a block diagram of an embodiment of a turbine section of a gas turbine engine that includes two boilers.

FIG. 3 is a block diagram of an embodiment of the turbine section 20 that includes a plurality of reheaters 13, 178, e.g., boilers 34. In the illustrated embodiment, the turbine section 20 is coupled to a first boiler 180 and a second boiler 182. Specifically, the boiler inlet gas 36 from the high pressure turbine 74 may enter the first boiler 180, which may be configured in a similar manner to the boiler 34 shown in FIG. 2. The second combustion gas 38 from the first boiler 180 may then enter the intermediate pressure turbine 76. After being expanded in the intermediate pressure turbine 76, the second combustion gas 38 may then be routed to the second boiler 182 to generate a third combustion gas 186. The second boiler 182 may be configured in a similar manner to the boiler 34 shown in FIG. 2. The third combustion gas 186 may then be expanded in a low pressure turbine 188 to generate the heated exhaust gas 48 that is then routed to the HRSG 42. In further embodiments, different numbers of boilers 34 may be used in turbine sections 20 that include different numbers of stages and in different configurations than that shown in FIG. 3. For example, the first boiler 180 may be omitted and only the second boiler 182 used, or the second boiler 182 may be omitted and only the first boiler 180 used. In other embodiments, multiple boilers could be used as the first boiler 180 and/or multiple boilers could be used as the second boiler 182. In further embodiments, other types of reheaters 13 could be used other than the boilers 34 described above. By using more than one boiler 34, the interstage temperatures of the turbine section 20 may be controlled or adjusted as needed.

Figure 4:
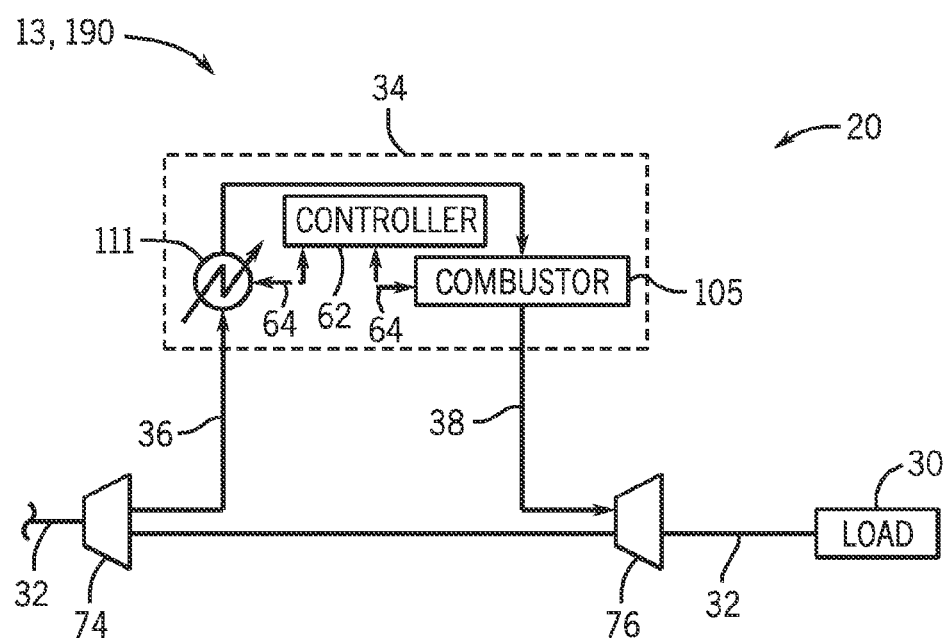
FIG. 4 is a block diagram of an embodiment of a turbine section of a gas turbine engine that includes a boiler with a downstream combustor.

FIG. 4 is a block diagram of an embodiment of the turbine section 20 having at least one reheater 13, 190. In the illustrated embodiment, the reheater 13, 190 includes the boiler 34 disposed between the high pressure turbine 74 and the intermediate pressure turbine 76. However, unlike the configuration of the boiler 34 shown in FIG. 2, the combustor 105 is located downstream of the heat exchangers 111. Thus, heat from the boiler inlet gas 36 may be used to generate steam prior to being combusted to generate the second combustion gas 38. In other words, the boiler inlet gas 36 is cooled prior to being combusted. In further embodiments, one or more heat exchangers 111 may be located upstream of the combustor 105 and one or more heat exchangers 111 may be located downstream of the combustor 105. By varying the number and configuration of the heat exchangers 111 with respect to the combustor 105, the temperature of the second combustion gas 38 may be adjusted or controlled as needed. Specifically, a peak temperature of the turbine section 20 may be controlled or adjusted using the controller 62 via signals 64. In addition, the amount of steam generated by the heat exchangers 111 may be adjusted or controlled using the controller 62. Thus, the configuration of the turbine section 20 may be flexible to enable intermediate stages of cooling to be introduced when trading off cost and performance issues of the turbine section 20.

As described above, certain embodiments may include the compressor section 16, the combustor 18, the turbine section 20, and the boiler 34 in a variety of configurations. For example, the gas turbine engine 12 may include other types of reheaters, combinations of reheaters and boilers, in any number. The boiler 34 may combust a mixture of the boiler inlet gas 36 and the fuel 26 to generate the second combustion gas 38, thereby generating additional energy and increasing efficiency. In addition, the heat generated by the combustion in the boiler 34 may be used to generate steam 40 from heat exchange with the second combustion gas 38. The steam 40 generated by the boiler 34 may then be used in the HRSG 42 or elsewhere. In addition, the temperature of the second combustion gas 38 may be greater than the temperature of the first combustion gas 36, thereby increasing the temperature of the heated exhaust gas 48. Thus, the gas turbine engine 12 may be used together with the steam power plant 14 in a combined cycle system 10. In other words, use of the boiler 34 enables the gas turbine engine 12 to produce the heated exhaust gas 48 at a high enough temperature to generate steam efficiently in the steam power plant 14. In addition, the boiler 34 may be easily added or retrofitted to the gas turbine engine 12. For example, a retrofit kit may include the boiler 34 and associated equipment and lines to couple to an existing gas turbine engine 12. Thus, the gas turbine engine 12 need not be redesigned, but instead the configuration of the gas turbine engine 12 may be simply modified to couple with the boiler 34, for example, via the retrofit kit. Therefore, the physical layout and design of the turbine section 20 need not be extensively modified or changed to accommodate use of the boiler 34. In addition, the cost and/or downtime associated with adding the boiler 34 may be small because no turbine redesign is required to use the boiler 34. Further, the boiler 34 enables the overall efficiency of the combined cycle system 10 to be higher compared to using unmodified gas turbine engines 12 that do not include the boiler 34. In other words, existing high-efficiency gas turbine engines 12, such as the LMS 100 turbine manufactured by General Electric Company of Schenectady, N.Y., that may not be ideal choices for combined cycle systems 10 because of low exit temperatures may now be modified to use the boiler 34, thereby resulting in combined cycle systems 10 with greater efficiencies than any others currently available.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gas turbine engine, comprising:
   a compressor section configured to generate compressed air;
   a combustor coupled to the compressor section, wherein the combustor is configured to combust a first mixture comprising the compressed air and a first fuel to generate a first combustion gas;
   a turbine section coupled to the combustor, wherein the turbine section is configured to expand the first combustion gas to generate an exhaust gas; and
   a boiler coupled to the turbine section, wherein the boiler is configured to combust a second mixture comprising a portion of the first combustion gas and a second fuel to generate a second combustion gas that is routed into the turbine section at a gas return location downstream from the combustor, and wherein the boiler generates a first steam from heat exchange with the second combustion gas.

2. The system of claim 1, wherein a temperature of the exhaust gas is greater than approximately 575 degrees Celsius.

3. The system of claim 1, comprising a steam power plant coupled to the turbine section.

4. The system of claim 1, wherein the steam power plant comprises:
   a heat recovery steam generator (HRSG) coupled to the turbine section, wherein the HRSG is configured to generate a second steam from heat exchange with the exhaust gas; and
   a steam turbine coupled to the HRSG, wherein the steam turbine is configured to drive a load using at least the first steam, or the second steam, or a combination thereof.

5. The system of claim 4, wherein the HRSG is configured to receive the first steam.

6. The system of claim 1, wherein the compressor section comprises a plurality of compressor stages and the turbine section comprises a plurality of turbine stages.

7. The system of claim 6, wherein the boiler is fluidly coupled to a first turbine stage of the plurality of turbine stages, or a second turbine stage of the plurality of turbine stages, or both the first and second turbine stages of the plurality of turbine stages at one or more locations downstream from the combustor.

8. The system of claim 6, comprising an intercooler coupled to a first compressor stage and a second compressor stage of the plurality of compressor stages, wherein the intercooler is configured to cool a first compressed air generated by the first compressor stage.

9. The system of claim 1, comprising a plurality of boilers fluidly coupled to the turbine section at one or more locations downstream from the combustor.

10. The system of claim 1, comprising a plurality of gas turbine engines fluidly coupled to the boiler at one or more locations downstream from the combustor.

11. The system of claim 1, wherein the compressor section comprises:
   a first compressor configured to generate an air flow;
   an intercooler coupled to the first compressor, wherein the intercooler is configured to cool the air flow; and
   a second compressor coupled to the intercooler, wherein the second compressor is configured to compress the air flow to generate the compressed air.

12. The system of claim 1, comprising a controller configured to control the boiler to increase a temperature of the exhaust gas.

13. A system, comprising:
   a turbine controller configured to control a reheater to increase a temperature of an exhaust gas generated by a combustor of a turbine engine having a turbine coupled to the reheater, wherein the reheater is configured to combust a mixture comprising a first combustion gas and a fuel to generate a second combustion gas that is routed into the turbine at a gas return location downstream from the combustor to be expanded in the turbine, and wherein the reheater generates steam from heat exchange with the second combustion gas.

14. The system of claim 13, wherein the reheater comprises:
   a reheat combustor configured to combust the first combustion gas and the fuel to generate the second combustion gas, a superheater heat exchanger configured to generate a superheated steam from heat exchange with the second combustion gas, a reheater heat exchanger configured to generate a reheated steam from heat exchange with the second combustion gas, and a boiler heat exchanger configured to generate steam from heat exchange with the second combustion gas.

15. The system of claim 14, wherein the reheater comprises a plurality of combustors.

16. The system of claim 13, wherein the mixture comprises compressed air from a compressor section coupled to the turbine.

17. A method, comprising:

compressing air in a compressor section of a turbine engine to generate compressed air;

combusting a first mixture comprising the compressed air and a first fuel in a combustor of the turbine engine downstream from the compressor section to generate a first combustion gas;

expanding the first combustion gas in a turbine section of the turbine engine downstream from the combustor to generate an exhaust gas;

combusting a second mixture comprising a portion of the first combustion gas and a second fuel in a boiler fluidly coupled to the turbine section downstream from the combustor to generate a second combustion gas;

routing the second combustion gas into the turbine section at a gas return location downstream from the combustor; and generating a first steam in the boiler by exchanging heat from the second combustion gas to a boiler feedwater.

18. The method of claim 17, comprising generating a superheated steam in the boiler by exchanging heat from the second combustion gas to an inlet steam.

19. The method of claim 17, comprising generating a second steam in a heat recovery steam generator (HRSG) from heat exchange with the exhaust gas.

20. The method of claim 17, wherein the turbine section comprises a plurality of turbine stages, wherein the boiler is fluidly coupled to a first turbine stage of the plurality of turbine stages, or a second turbine stage of the plurality of turbine stages, or both the first and second turbine stages of the plurality of turbine stages at one or more locations downstream from the combustor.

21. The system of claim 13, comprising the reheater coupled to the turbine controller.

22. The system of claim 13, wherein the reheater is separate from a heat recovery steam generator (HRSG) coupled to the turbine engine.

23. A system, comprising:

a gas turbine engine, comprising:

a compressor section configured to generate compressed air;

a combustor coupled to the compressor section, wherein the combustor is configured to combust a first mixture comprising the compressed air and a first fuel to generate a first combustion gas;

a turbine section coupled to the combustor, wherein the turbine section is configured to expand the first combustion gas to generate an exhaust gas; and a boiler coupled to the turbine section, wherein the boiler is configured to combust a second mixture comprising a portion of the first combustion gas and a second fuel to generate a second combustion gas that is routed to the turbine section, and wherein the boiler generates a first steam from heat exchange with the second combustion gas; and a heat recovery steam generator (HRSG) coupled to the turbine section, wherein the HRSG is configured to generate a second steam from heat exchange with the exhaust gas.

\* \* \* \* \*